United States Patent [19]
Wu

[11] Patent Number: 5,668,968
[45] Date of Patent: Sep. 16, 1997

[54] TWO-LEVEL VIRTUAL/REAL SET ASSOCIATIVE CACHE SYSTEM AND METHOD WITH IMPROVED SYNONYM DETECTION

[75] Inventor: Ching-Farn E. Wu, Yorktown Heights, N.Y.

[73] Assignee: International Business Machines Corporation, Armonk, N.Y.

[21] Appl. No.: 345,802

[22] Filed: Nov. 22, 1994

Related U.S. Application Data

[63] Continuation of Ser. No. 844,812, Mar. 2, 1992, abandoned.

[51] Int. Cl.⁶ .......................... G06F 12/10; G06F 12/08
[52] U.S. Cl. .......................... 711/3; 711/207; 711/210; 711/122; 711/128
[58] Field of Search .......................... 395/445, 446, 395/455, 466, 449, 497.01, 497.02, 497.03, 497.04, 600, 403, 405, 413, 419, 420, 417

[56] References Cited

U.S. PATENT DOCUMENTS

| | | | |
|---|---|---|---|
| 4,096,573 | 6/1978 | Heller et al. | 395/417 |
| 4,136,385 | 1/1979 | Gannon et al. | 395/417 |
| 4,332,010 | 5/1982 | Messina et al. | 395/403 |
| 4,400,770 | 8/1983 | Chan et al. | 395/403 |
| 4,612,612 | 9/1986 | Woffinden et al. | 395/403 |
| 4,682,281 | 7/1987 | Woffinden et al. | 395/417 |
| 4,727,482 | 2/1988 | Roshon-Larsen et al. | 395/412 |
| 4,731,739 | 3/1988 | Woffinden et al. | 395/250 |
| 4,736,293 | 4/1988 | Patrick | 395/455 |
| 4,797,814 | 1/1989 | Brenza | 395/403 |
| 4,800,489 | 1/1989 | Moyer et al. | 395/416 |
| 4,905,141 | 2/1990 | Brenza | 395/456 |
| 4,985,829 | 1/1991 | Thatte et al. | 395/417 |
| 5,003,459 | 3/1991 | Ramanujan et al. | 395/403 |
| 5,109,335 | 4/1992 | Watanabe | 395/403 |
| 5,119,290 | 6/1992 | Loo et al. | 395/420 |

FOREIGN PATENT DOCUMENTS

| | | |
|---|---|---|
| 0348628 | 1/1990 | European Pat. Off. . |
| 90/00283 | 1/1990 | WIPO . |

OTHER PUBLICATIONS

Smith, "Cach Memories," *Computing Surveys*, vol. 14, No. 3, pp. 473–530, Sep. 1982.

Baer et al, "On the Inclusion Properties for Multi-Level Cache Hierarchies," *Proc. 15th Intl. Symposium on Computer Architectures*, 1988, pp. 73–80.

Bakoglu et al, "The IBM RISC System/6000 Processor: Hardware Overview," IBM Jour. Res. and Develop., vol. 34, No. 1, pp. 12–22, Jan. 1990.

(List continued on next page.)

*Primary Examiner*—Glenn Gossage
*Attorney, Agent, or Firm*—Sterne, Kessler, Goldstein & Fox, P.L.L.C.

[57] ABSTRACT

A two-level virtual/real cache system, and a method for detecting and resolving synonyms in the two-level virtual/real cache system, are described. Lines of a first level virtual cache are tagged with a virtual address and a real pointer which points to a corresponding line in a second level real cache. Lines in the second level real cache are tagged with a real address and a virtual pointer which points to a corresponding line in the first level virtual cache, if one exists. A translation-lookaside buffer (TLB) is used for translating virtual to real addresses for accessing the second level real cache. Synonym detection is performed at the second level real cache. An inclusion bit I is set in a directory of the second level real cache to indicate that a particular line is included in the first level virtual cache. Another bit, called a buffer bit B, is set whenever a line in the first level virtual cache is placed in a first level virtual cache writeback buffer for updating main memory. When a first level cache miss occurs, the TLB generates a corresponding real address for that page and the first level virtual cache selects a line for replacement and also notifies the second level real cache which line it chooses for replacement. The real address is then used to access the second level real cache. Synonym detection and resolution are performed by the second level real cache.

14 Claims, 4 Drawing Sheets

OTHER PUBLICATIONS

Bederman, "Cache Management System Using Virtual and Real Tags in the Cache Directory," IBM Tech. Disc. Bull., vol. 21, No. 11, Apr. 1979, p. 4541.

IBM Technical Disclosure Bulletin, "L1/L2 Organization Multiple Level Cache For Computer System Data Sharing", L. Liu, vol. 30, No. 9, Feb. 1988, pp. 478.

IBM Technical Disclosure Bulletin, "Second Level Cache With Compact Directory", D.B. Martin and B.U. Messina, vol. 29, No. 9, Feb. 1987, pp. 4011-4014.

IBM Technical Disclosure Bulletin, "Cross-Interrogate Directory For A Real, Virtual Or Combined Real/Virtual Cache", J.G. Brenza, vol. 26, No. 11, Apr. 1984, pp. 6069-6070.

"Organization and Performance of a Two-Level Virtual-Real Cache Hierachy", by Wen-Hann Wang, et. al., Proceedings of 16th Intl. Symposium on Computer Architecture, 1989, pp. 140-148.

TWO-LEVEL VIRTUAL/REAL SET ASSOCIATIVE CACHE SYSTEM AND METHOD WITH IMPROVED SYNONYM DETECTION

This application is a continuation, of application Ser. No. 07/844,812, filed Mar. 2, 1992, now abandoned.

TECHNICAL FIELD

The field of the present invention relates generally to data processors, and more particularly, the present invention relates to a two-level virtual/real set-associative cache system and method.

BACKGROUND ART

A more detailed description of some of the basic concepts discussed in this application is found in a number of references, including Hennessy, John L., et al., *Computer Architecture—A Quantitative Approach*" (Morgan Kaufmann Publishers, Inc., San Mateo, Calif., 1990). Hennessy's text, particularly Chapter 8, provides an excellent discussion of cache memory issues addressed by the present invention.

A cache is a relatively small high-speed memory that is used to hold the contents of most recently used blocks of main storage. It is used to bridge the gap between fast processor cycle time and slow memory access time. A cache is physically distinct from the main memory and is usually not addressable by programs. Conventional data processing systems having a cache memory system comprise a central processor unit (CPU or microprocessor), a cache memory, and a secondary memory (for example, a higher level cache memory or main memory). The processor generates an operand address which is compared, with or without translation, to the addresses in the cache memory. If there is a cache "hit", the addressed location in the cache memory is accessed. If there is a cache "miss", the address is translated and then passed to the secondary memory. The data is retrieved from secondary memory and put into the cache. This usually causes the CPU to pause until the data is available.

The success of cache memories comes from an empirical observation known as the "property of locality", which can be stated as: information in use in the near future is likely to consist of that information in current use (locality by time), and that information logically adjacent to that in current use (locality by space).

Not all objects referenced by a program need to reside in main memory. If the computer has "virtual memory", then some objects may reside on disk, or the like. The address space is usually broken into fixed-size blocks, called "pages". At any time, each page resides either in main memory or on disk. When the CPU references an item within a page that is not present in the cache or main memory, a "page fault" occurs, and the entire page is moved from the disk to main memory. The cache and main memory have the same-relationship as the main memory and disk.

A memory hierarchy normally consists of many levels, but it is managed between two adjacent levels at a time. The "upper" level—the one closer to the CPU—is smaller and faster than the "lower" level. The minimum unit of information that can be either present or not present in the two-level hierarchy is called a "block". The size of that block may be either fixed or variable. If it is fixed, the memory size is a multiple of that block size. Success or failure of an access to the upper level is designated as a hit or a miss.

The memory address is divided into pieces that access each part of the hierarchy. The "block-frame address" is the higher-order piece of the address that identifies a block at that level of the hierarchy. The "block-offset address" is the lower-order piece of the address and identifies an item within a block. The size of the block-offset address is $\log_2$ (size of block). The size of the block-frame address is then the size of the full address at this level less the size of the block-offset address.

The CPU must have some mechanism to determine whether or not information is in the top level of the memory hierarchy. This check happens on every memory access and affects hit time. Maintaining acceptable performance usually requires the check to be implemented in hardware. The final implication of a memory hierarchy is that the computer must have a mechanism to transfer blocks between upper- and lower-level memory. If the block transfer requires tens of clock cycles, it is controlled by hardware. If it requires thousands of clock cycles, it can be controlled by software. For caches, the word "line" is often used instead of block.

Restrictions on where a block is placed create three categories of cache organization. If each block has only one place it can appear in the cache, the cache is said to be "direct mapped". The mapping is usually (block-frame address) modulo (number of blocks in cache). If a block can be placed anywhere in the cache, the cache is said to be "fully associative". If a block can be placed in a restricted set of places in the cache, the cache is said to be "set associative". A "set" is a group of two or more blocks or lines in the cache. A block is first mapped onto a set, and then the block can be placed anywhere within the set. The set is usually chosen by bit selection; that is, (block-frame address) modulo (number of sets in cache). If there are "n" blocks in a set, the cache placement is called "n-way set associative".

The range of caches from direct mapped to fully associative is really a continuum of levels of set associativity. Direct mapped is simply one-way set associative and a fully associative cache with n blocks could be called n-way set associative.

Caches include an address tag on each block that gives the block-frame address The tag of every cache block that might contain the desired information is checked to see if it matches the block-frame address from the CPU. Because speed is of the essence, all possible tags are searched in parallel. Serial searching would make set associativity counter productive.

There must be a way to know that a cache block does not have valid information. The most common procedure is to add a "valid bit" to the tag to say whether or not this entry contains a valid address. If the bit is not set, there cannot be a match on this address. One tag is required for each block. An advantage of increasing block sizes is that the tag overhead per cache entry becomes a smaller fraction of the total cost of the cache.

A CPU address is divided into three fields to find data in a set-associative cache. The "block-offset" field used to select the desired data from the block. The "index" field used to select the set. The "tag" field used for the comparisons. While the comparison could be made on more of the address than the tag, there is no need. If total size is kept the same, increasing associativity increases the number of blocks per set thereby decreasing the size of the index and increasing the size of the tag.

A benefit of direct-mapped placement is that hardware decisions are simplified. In fact, so simple that there is no choice: only one block is checked for a hit, and only that block can be replaced. With fully associative or set-associative placement, there are several blocks to choose from on a miss. There are two primary strategies employed for selecting which block to replace.

First, candidate blocks are randomly selected. Some systems use a scheme for spreading data across a set of blocks in a pseudo-randomized manner to get consistent behavior.

The second approach is called the "least-recently used" (LRU) technique. To reduce the chance of throwing out information that will be needed soon, accesses to blocks are recorded. The block replaced is the one that has been unused for the longest time. This makes use of a corollary of temporal locality: If recently used blocks are likely to be used again, then the best candidate for disposal is the least recently used.

Because at any instant in time computers are running multiple processes, there must be a means of sharing a smaller amount of physical memory between many processes. One way to do this, called "virtual memory", divides physical memory into blocks and allocates them to different processes. With virtual memory, the CPU produces "virtual" addresses that are translated by a combination of hardware and software to "physical addresses", which can be used to access main memory. This process is called "memory mapping" or "address translation". Today, the two memory hierarchy levels controlled by virtual memory are DRAMs and magnetic disks.

There are further differences between caches and virtual memory. Replacement on cache misses is primarily controlled by hardware, while virtual memory replacement is primarily controlled by the operating system; the longer miss penalty means the operating system can afford to get involved and spend more time deciding what to replace. The size of the CPU address determines the size of virtual memory, but the cache size is normally independent of the CPU address. In addition to acting as the lower-level memory for main memory in the hierarchy, secondary storage is also used for the file system that is not normally part of the address space. Most secondary storage is taken up by the file system.

Virtual memory encompasses several related techniques. Virtual memory systems can be categorized into two classes: those with fixed-size blocks, called "pages", and those with variable size blocks, called "segments". Pages are typically fixed at 512 to 8192 bytes, while segment sizes vary. The largest segment supported on any machine ranges from $2^{16}$ bytes up to $2^{52}$ bytes; the smallest segment is one byte.

The decision to use paged virtual memory versus segmented virtual memory affects the CPU. Paged addressing has a single, fixed-size address divided into page number and offset within a page, analogous to cache addressing. A single address does not work for segmented addresses. The variable size of segments requires one word for a segment number and one word for an offset within a segment, for a total of two words. An unsegmented address space is simpler for the compiler. Both paging and segmentation rely on a data structure that is indexed by the page or segment number. This data structure contains the physical address of the block. For paging, the offset is simply concatenated to this physical page address. For segmentation, the offset is added to the segment's physical address to obtain the final virtual address.

The data structure containing the physical page addresses usually takes the form of a "page table". Indexed by the virtual page number, the size of the table is the number of pages in the virtual-address space. To reduce address translation time, computers use a cache dedicated to these address translations. This specialized cache is called a translation-lookaside buffer (TLB), or simply translation buffer.

Almost all operating systems try to replace the LRU block, because that is the one least likely to be needed. To help the operating system estimate LRU, many machines provide a "use bit" or "reference bit", which is set whenever a page is accessed. The operating system periodically clears the use bits and later records them so it can determine which pages were touched during a particular time period. By keeping track in this way, the operating system can select a page that is among the least-recently referenced.

A TLB entry is like a cache entry where the tag holds portions of the virtual address, and the data portion holds a physical page-frame number, protection field, use bit, and a dirty bit. A feature called the "dirty bit" is commonly used to reduce the frequency of writing back blocks on replacement. The dirty bit is a status bit that indicates whether or not the block was modified while in the cache. If it wasn't, the block is not written, since the lower level has the same information as the cache. To change the physical page-frame number or protection of an entry in the page table the operating system must make sure the old entry is not in the TLB. Otherwise, the system won't behave properly. Note that this dirty bit means the corresponding page is dirty, not the address translation in the TLB is dirty, nor that a particular block in the data cache is dirty. Typically, if a page is dirty it is just discarded and replaced with the page having the new line required by the CPU.

A conventional solution for lowering bit time is to use the physical part of the address to index the cache while sending the virtual address through the TLB. The limitation is that a direct-mapped cache can be no bigger than the page size. To allow large cache sizes with the 4-KB pages in the System/370, International Business Machines (IBM) Corporation (Armonk, N.Y.) uses high associativity so that they can still access the cache with a physical index. The IBM 3033, for example, is 16-way set associative with a 64 byte line size, even though studies (Smith, A. J., "Cache Memories," *Computing Surveys*, Vol. 14, No. 3, pp. 473–530 September 1982) show there is little benefit to miss rates above 8-way set associativity IBM Corporation, Armonk, N.Y., "IBM 3033 Processor Complex: Theory of Operation/Diagrams Manual," IBM Armonk, N.Y., 1978).

One scheme for fast cache hits without the size restriction is to use a more heavily pipelined memory access where the TLB is just one step of the pipeline. The TLB is a distinct unit that is smaller than the cache to permit shorter access time. This scheme doesn't change memory latency, but relies on the efficiency of the CPU pipeline to achieve higher memory bandwidth.

Another alternative is to match on virtual addresses directly, i.e. to use the virtual addresses directly to index a cache. Such caches are termed "virtual caches". This eliminates the TLB translation time from a cache hit. Why doesn't everyone build virtually addressed caches? One reason is that every time a process is switched, the virtual addresses refer to different physical addresses, requiring the virtual cache to be flushed. One solution is to increase the width of the cache-address tag with a process-identifier tag (PID). If the operating system assigns these tags to processes, the virtual cache only needs to be flushed when a PID is recycled (the PID provides protection).

Another reason why virtual caches are not more universally adopted has to do with operating systems and user programs that use two different virtual addresses for the same physical address. These duplicate addresses, called "synonyms" or "aliases", could result in two copies of the same data in a virtual cache. If one is modified, the other will have the wrong value. With a physical cache this wouldn't happen, since the accesses would first be translated to the same physical cache block. There are hardware schemes, called "anti-aliasing", that can guarantee every cache block a unique physical address, but software can make this much easier by forcing aliases to share some address bits.

Traditional caches use page offsets to select cache lines. Virtual-to-real address translation is typically performed at the same time using the TLB. Given a fixed page size and line size, the number of bits available for accessing the cache data array is fixed and is usually small. When technology improves, so does the size of the cache array available. This in turn forces the cache set-associativity to increase if address translation is to be overlapped.

Other systems such as IBM RS/6000 (Bakoglu, et al., "The IBM RISC System/6000 Processor: Hardware Overview," IBM J. Research and Development, Vol. 34, No. 1, pp. 12–22, January 1990), are forced to keep part of the virtual and real addresses identical in the data cache by software. As the cache size grows beyond 64 KB, however, keeping address bits equal in virtual and real addresses implies restricted data allocation in main memory. This would also eliminate possible locations in cache that can reduce the miss ratio advantage due to set-associative cache structures.

Virtual address tags in cache structures have also been proposed. Each address in a virtual address cache directory must be tagged with its process ID, or else the cache must be purged every time task switching occurs. Even so, virtual address caches have a serious problem with synonyms. Bederman (Bederman, S., "Cache Management System Using Virtual and Real Tags in the Cache Directory," IBM Technical Disclosure Bulletin Vol. 21, No. 11, pp. 4541, April 1979) proposed a cache structure with both virtual and real address tags to avoid synonyms. Bederman uses the same bits to index both a real virtual cache. His approach is therefore limited in size and must be smaller than the page size times the associativity.

Bederman does a virtual address comparison first, but if a synonym is detected the line will be undetectable in the cache. During the next cycle, however, once the TLB has translated the virtual address to the real address (i.e., the real page number, because the offset is the same for both the real and virtual addresses; the offset is a total of 12 bits, and the least significant bits (LSBs) of the offset indicate the byte address within the line), then the real page number generated by the TLB can be compared with the real address tag in the cache to make sure that there is no synonym.

To efficiently detect synonyms and get the needed information, a closer look at cache structures is required. A similar two-level approach was proposed in Wang et al., "Organization and Performance of a Two-level Virtual-Real Cache Hierarchy," Proc. of 16th Intl. Symposium on Computer Architecture, pp. 140–148, May 1989 with a complicated L1/L2 interface, which assumes a complex L1 being able to move cache lines within L1. Wang's cache system has an L1 cache that is capable of transferring lines from one location to another within itself. The L1 cache therefore requires rather complicated hardware.

SUMMARY OF THE INVENTION

The present invention is different from Bederman's approach, in that pointers instead of virtual/real page numbers are used as tags in a two-level set-associative cache. In addition, the present invention uses a synonym address to directly address L1 lines.

Each location of the secondary memory contains, in addition to data, synonym information representing "present" if the first memory has a corresponding location containing the same data as is contained in the location in the second memory, or representing "absent" if the first memory has no corresponding location containing the same data as is contained in the location in the second memory. Each location of the secondary memory also contains a synonym address representing the address of the corresponding location in the first memory if the synonym information is "present". If the output of the comparator indicates "miss", the synonym information and synonym address are read out of the corresponding location of the second memory.

A synonym comparator receives the synonym information and synonym address from the corresponding location in the second memory, and, if synonym information is "present", outputs the synonym address to the address input of the first memory.

The foregoing and other features and advantages of the invention will be apparent from the following more particular description of the preferred embodiments of the invention, as illustrated in the accompanying drawings.

BRIEF DESCRIPTION OF THE DRAWINGS

The invention will be better understood if reference is made to the accompanying drawings in which.

BEST MODE FOR CARRYING OUT THE INVENTION

In the following discussion, it is assumed that the real, lower level cache always includes the lines in the virtual, upper level cache. This inclusion property is essential in reducing the cache coherence complexity for multiprocessors (Baer, et al. "On the Inclusion Properties for Multi-Level Cache Hierarchies," Proc. 15th Intl. Symposium on Computer Architectures, pp. 73–80, 1988).

In contrast to Wang, the present invention modifies the L1 cache with limited overhead so that the needed information can be quickly accessed.

In a preferred embodiment of the present invention, each line of a virtual, upper level cache (L1) is tagged with a virtual address plus a real pointer which points to the line in a real, lower level cache (L2) which holds a corresponding line of data. Each L2 cache line is tagged with a real address plus a virtual pointer (VP) which points to the corresponding line in L1, if one exists. Thus, L1 is a virtual address cache and L2 is a real address cache. Since the size of L1 or L2 caches are much smaller than address spaces, pointers, which are much shorter than address tags, are employed together with tags, rather than tags alone. The pointer relationship between lines in L1 and L2 is set up in an L1 and an L2 directory, respectively, whenever an L2 line is loaded into the L1 cache.

A portion of the virtual address (VA) is used to index the virtual cache L1, and the remainder of the virtual address becomes a virtual address tag (virtual tag or VT) stored in the virtual cache directory to indicate whether the corresponding line of data is stored in L1.

A portion of the real address (RA) is used to index the real cache L2, and the remainder of the real address becomes a real address tag (real tag or RT) stored in the real cache directory to indicate whether the corresponding line of data is stored in L2.

The real pointer (RP) associated with the virtual address for each entry in the L1 cache is represented by 6 bits for a 256 KB L2 cache. The virtual pointer associated with the real address for each entry in the L2 cache is represented by only 2 bits for a 16 KB L1 cache. These pointer lengths are directly dependent on the size of the corresponding cache.

A one-bit inclusion tag "I" is set in the L2 directory to indicate that the line is included in L1. Parallel accesses to the L1 cache and a TLB are achieved using virtual page numbers (VPNs). When an L1 miss occurs, the TLB generates the corresponding real address for that page, L1 selects a line for replacement, and also notifies L2 which line it chooses in the selected set. The real address is then used to access the L2 cache. Note that the L2 directory includes real address tags and virtual pointers, which are compared with the reference real address and virtual address, respectively. Based on the virtual/real cache system just introduced, there are four possible comparison results:

Case 1: If an L2 miss occurs and none of the real address tags in the selected L2 set matches the reference real address, then L2 selects a line for replacement.

Case 2: If an L2 hit occurs and the inclusion tag I is 0, then the L2 line is not in L1, and therefore must be loaded into L1.

Case 3: If an L2 hit occurs, the inclusion tag I is 1, and the virtual pointer comparison fails, then an L1 line in another set must hold the needed information.

Case 4: If an L2 hit occurs, the inclusion tag I is 1, and the virtual pointer comparison succeeds, then L1 actually contains the needed line in the same set by coincidence. Therefore, L1 cancels its write back for the replaced line, if one exists.

In a preferred embodiment of the present invention, a two-to-one multiplexer is added in front of the L1 cache access path, and is controlled by a "synonym present" signal from L2. During normal operation, the selected data line is sent to the CPU whenever L1 has a hit. When a synonym occurs, the address from L2 formed by a virtual pointer and partial offset bits is used to access L1 cache, and selection within the L1 set is done by the virtual pointer. Because the virtual pointer points to a line in an L1 set, only part of the virtual pointer is needed for comparison in L2. Note that a virtual pointer includes two parts: "set within the cache" and "line within the set". The former is concatenated with (the partial) offset bits to access L1 cache just like virtual address does, and the latter is used to select a line in a set in the L1 cache. This eliminates duplicated lines in L1, thereby solving synonym problems without a reverse translation table.

Figure 1:
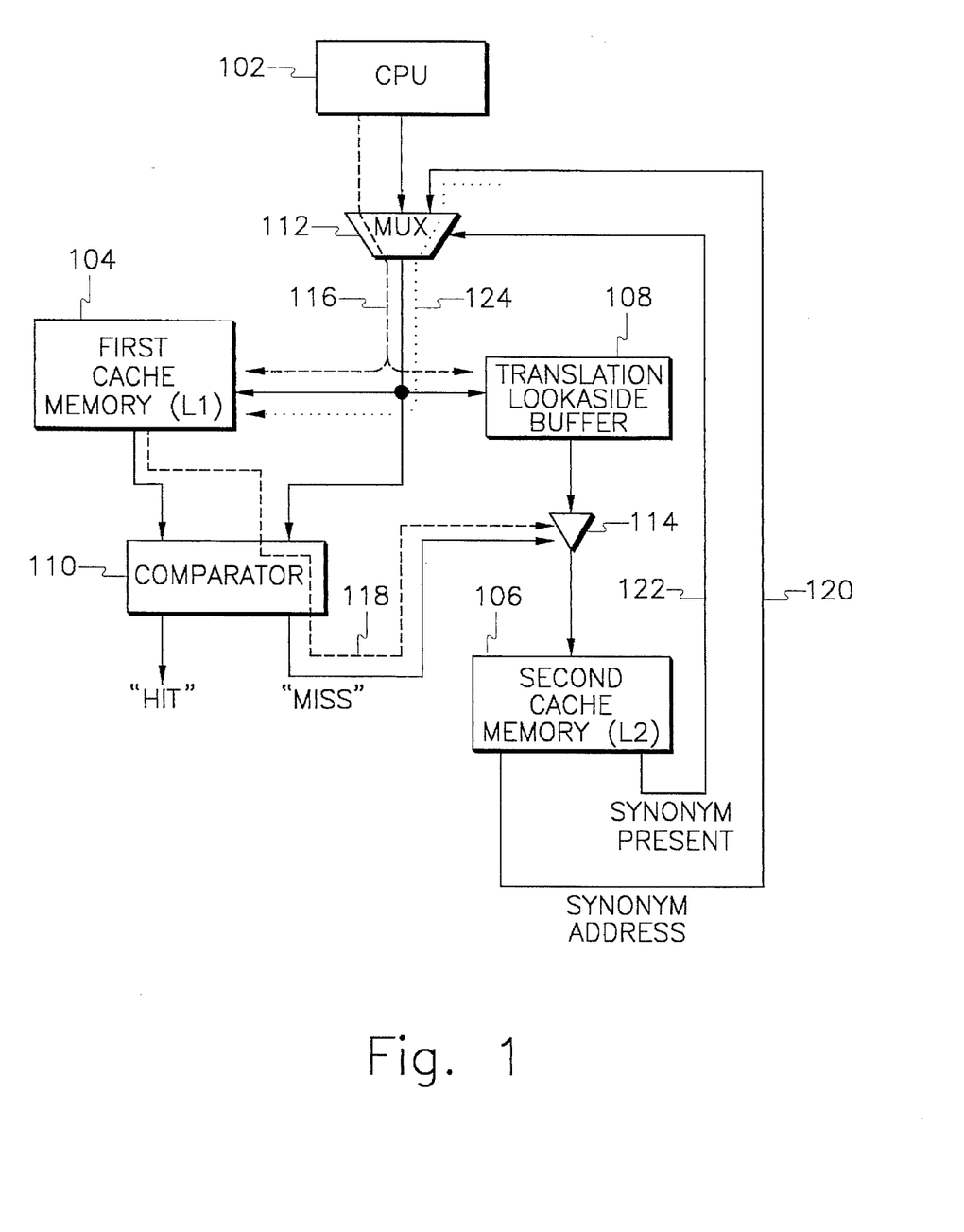
FIG. 1 shows a representative high level block diagram of a data processing system of the present invention.

FIG. 1 shows a representative high level block diagram of a data processing system of the present invention. The representative data processing system comprises a microprocessor or CPU 102, a first memory or cache 104 (L1), a second memory or cache 106 (L2), a translation look-aside buffer (TLB) 108, a comparator 110, a multiplexer 112 and a tri-state buffer/latch mechanism 114. Caches 104 and 106 and the TLB 108 may comprise SRAMs, DRAMs, or the like.

For the purposes of this disclosure, the CPU 102 may be a vector, scalar, or superscalar processor. A virtual memory or cache 104 (L1) and a real memory or cache 106 (L2) may be fabricated together with the CPU 102 on the same die or they may be separate, discrete devices. Alternatively, L1 may be on-chip and L2 may be off-chip.

In an example shown in FIG. 1, the data processing system comprises a 32-bit address space, 4 kilobyte (KB) page size, 64 byte (B) line size, a 16 KB two-way set associative L1 cache, and a 256 KB four-way set associative L2 cache. A 32-bit virtual address in the 32-bit address space contains a 12-bit page offset and a 20-bit virtual page number. The virtual page number is used to access the TLB as well as the L1 cache in parallel during normal operation, as shown generally by the path defined by a broken line 116. The L1 cache has a write buffer for data line write back and an LRU policy for line replacement. The L1 cache sends L2 its decision on which line to be replaced through LRU bits whenever a L1 miss occurs, so that L2 knows how to set up its virtual pointer. This control flow is shown generally by the path defined by a broken line 118. The data flow is not shown. A buffer tag (B tag) in the L2 directory (not shown) is used to indicate if the corresponding line in L1 is in the write buffer (not shown).

When an L1 miss is detected, the real page number from the TLB translation is concatenated with partial offset bits to access the L2 cache. If the real tag matches the given real address RA[0:15] and the inclusion tag I is one, a synonym is detected. The synonym address 120 is then passed to L1 using the synonym present signal to control the MUX 112. The synonym address is used to index the data in L1, as shown generally by a dotted line 124.

Note that the extra hardware for virtual pointer comparisons is extremely simple. Only four 1-bit comparators and associated logic are required in the above case. When virtual pointer VP[0] is used for LRU information (line within a set), only VP[1] needs to be compared with virtual address VA[19] for the four lines in the L2 set for synonym check. Thus, the partial virtual pointer in FIGS. 2A-2B (discussed in detail below) for selecting a line within a set is VP[0], and the required overhead is minimal.

When using the LRU technique for cache line replacement, if the LRU line to be replaced is dirty it would ordinarily be placed in the write back buffer of L1 for updating the main memory. However, it does not have to be written back in the case of a synonym because, by definition, the current reference line will still be in the same cache set. Therefore, L1 simply cancels the write back. In contrast to Wang's cache system, resources are conserved because no cache line moving is required. This major feature of the present invention will be discussed further with reference to FIGS. 2A-2B and 3.

Turning now to the flow chart in FIGS. 2A and 2B, a representative example of a preferred embodiment of the virtual cache of the present invention will be discussed. At the top FIG. 2A, it is assumed that the CPU made a data request and has sent a virtual address 202 to the virtual cache L1. Virtual address 202 comprises 20 virtual page number bits [0:19] and 12 offset bits [20:31]. A line 204 represents the forwarding of various VA bits required by specific operational steps to be discussed below.

As discussed above, four separate cases are invoked when L1 has a cache miss, and an inclusion tag (I tag) is used to detect synonyms. The virtual pointers are compared to determine whether the synonym line is in the same set as the current reference. The virtual pointers plus an offset are used to index L1 to determine the set and address of the synonym. Only case 4 indicates that the line is in the same set in L1 as the current reference.

In this example, the virtual pointer of the real cache L2 has only 2 bits, VP[0:1], one bit is used to access the L1 cache set and the second virtual pointer bit is used to select the line of the set. The assignment of the bits is a design choice.

Figure 2A:
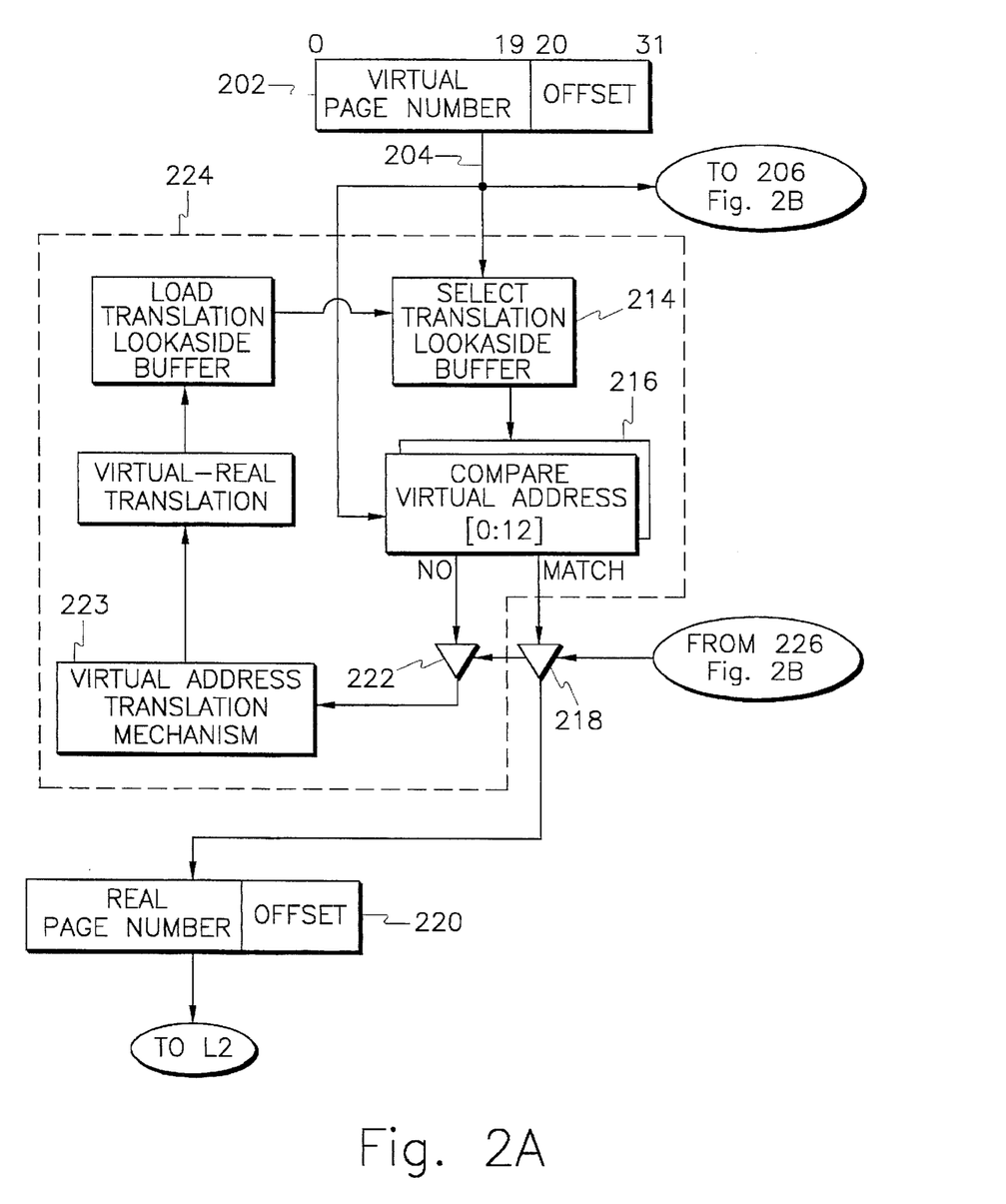
FIGS. 2A–2B show a representative flow chart of a virtual cache (L1) in a preferred embodiment of the present invention.
Figure 2B:
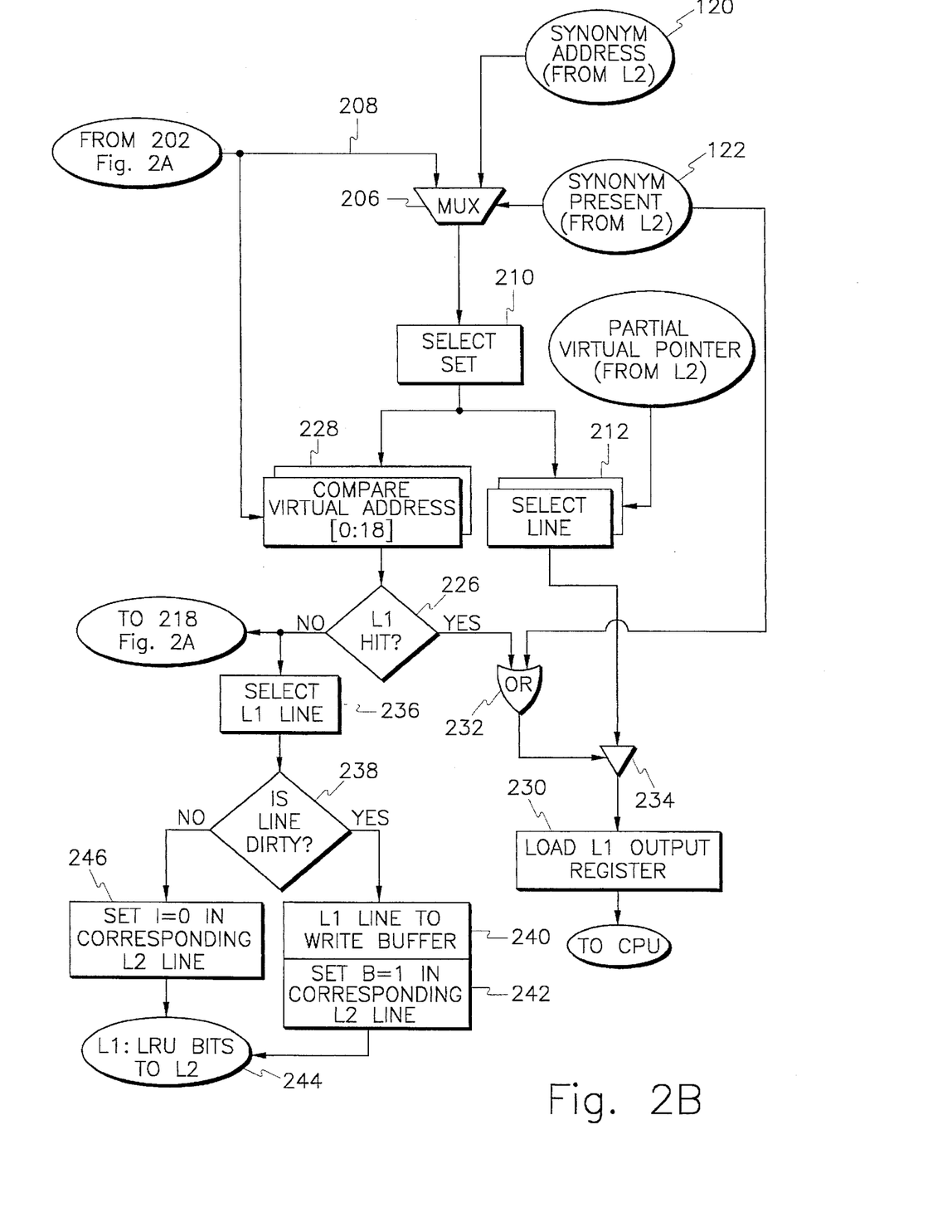

For selection of the set, the LSB [19] of the virtual page number is passed on a line 208 through a multiplexer (MUX) operation shown at a step 206 during normal operation to select the set of cache L1 (see FIG. 2B). Other index bits from the page offset are not shown. To implement selection of the VPN bit during normal operation a "syn present" signal is not asserted at the select input of the MUX step 206. (The MUX 206 is an operational equivalent to the MUX 112 in FIG. 1.) Because of the size of the cache in the present example, the MUX step 206 only selects one bit.

Alternatively, when a synonym is present at L2, as indicated by assertion of a "syn present" signal to the select input of MUX 206, bit [1] of the virtual pointer is used to select the set of L1. When the "syn present" from L2 control signal is asserted, VP[1] is passed from L2 through MUX step 206 to access a set in L1. The output of MUX step 206 selects the set of the virtual cache L1, as shown at a step 210.

The first bit of the virtual pointer (VP[0]) is used as the "partial" input to a line select step 212 to select the line in the set where the data is stored. In this example, L1 is a two-way set-associative cache, signifying two lines per set, as shown in step 212. Thus, only one bit is needed to select the line within the set. A "0" may select the first line of the set and a "1" may select the second line, for example.

As shown in FIG. 2A, the lower bits of the virtual page number are used to index the TLB. The number of bits of the virtual page number required to index the TLB depends on its size. In this example, the 7 LSBs of the virtual page number (VPN[13:19]) are used because the TLB comprises 128 sets (i.e., $2^7$). See the "select TLB" step 214. Virtual address bits [0:12] are compared with the TLB indexed virtual page number, as shown at step 216. If a "match" occurs the real page number is readily available, a tri-state buffer operation is performed at a step 218, concatenated with the offset at a step 220 and sent to the L2 cache.

If the comparison with TLB at step 216 results in "no" match, the virtual address is tri-state buffered at a step 222. It is then translated into the real address by an operating system translation mechanism 223, such as a two-level segment and page table, as depicted by loop 224 (the steps within the dashed box). After one iteration of loop 224 is completed, a "match" is assured and the completed real address is passed to the L2 cache after performing steps 218 and 220.

Steps 218 and 222 can be performed by any device that functions to conditionally buffer the result of a step 216 according to the timing of a select signal generated by a "no" outcome if there is no L1 cache hit, as determined by a comparator step 226. In other words, the TLB information is not needed unless an L1 cache miss occurs. Steps 218 and 222 are the operational equivalent to step 114 in FIG. 1.

As noted above, the LSBs of the offset are used to indicate the byte address within the line. The remaining 6 bits of the offset together with the LSB of the virtual page number (VPN[19]), are used to access the cache. Therefore, the remaining virtual address bits [0:18] become the virtual address tag. The virtual tag of the received virtual address is compared with the virtual tags of the two lines within the set selected at step 210, as shown at a set of comparator steps 228. Step 226 indicated whether a cache hit has occurred and outputs the appropriate "yes" or "no" result. Steps 226 and 228 are the operational equivalent to step 110 in FIG. 1.

If step 226 outputs "yes" representing a cache hit or a synonym is detected by L2, the data selected at step 212 is sent to the CPU by loading the L1 output register, as shown at a step 230. The ORing operation is performed by a step 232. Step 232 outputs a control signal to pass the data from step 212 to the output register by enabling a tri-state buffer 234.

If a cache miss occurs at L1, as indicated by the "no" result at step 226, a line must be selected for replacement. In a preferred embodiment of the present invention, an LRU technique is used to select a candidate replacement line, as shown generally at a step 236.

Next, at step 238, the cache system of the present invention checks whether the candidate replacement line is dirty or not. If the result is "yes", the branch pointing to steps 240 and 242 is taken. At step 240 the data in the candidate replacement line is sent to the write buffer for later writing to the main memory in a known manner. At step 242, the buffer tag (B tag) associated with the virtual pointer stored in the L2 line corresponding to the candidate replacement line in L1 is set equal to 1, indicating that the candidate replacement line has gone to L1's write buffer.

Finally, after the data has been sent to the write buffer and the L2 cache buffer tag information is updated, the L1 cache must pass LRU bits to the L2 cache, as shown at a step 244. The LRU bits identify which line is now vacant. The L2 cache uses the LRU bits to set up the virtual pointer for the CPU request.

If the result is "no" at conditional step 238, the inclusion tag I associated with the virtual pointer stored in the L2 line corresponding to the candidate replacement line is adjusted by resetting tag I to 0, because the line does not need to be written back to main memory and will soon be replaced by the data requested by the CPU. The reset of the I tag is shown generally at a step 246. After the I tag information is updated, flow proceeds to the step 244 where the LRU bits are passed to the L2 cache, as discussed in the preceding paragraph.

Figure 3:
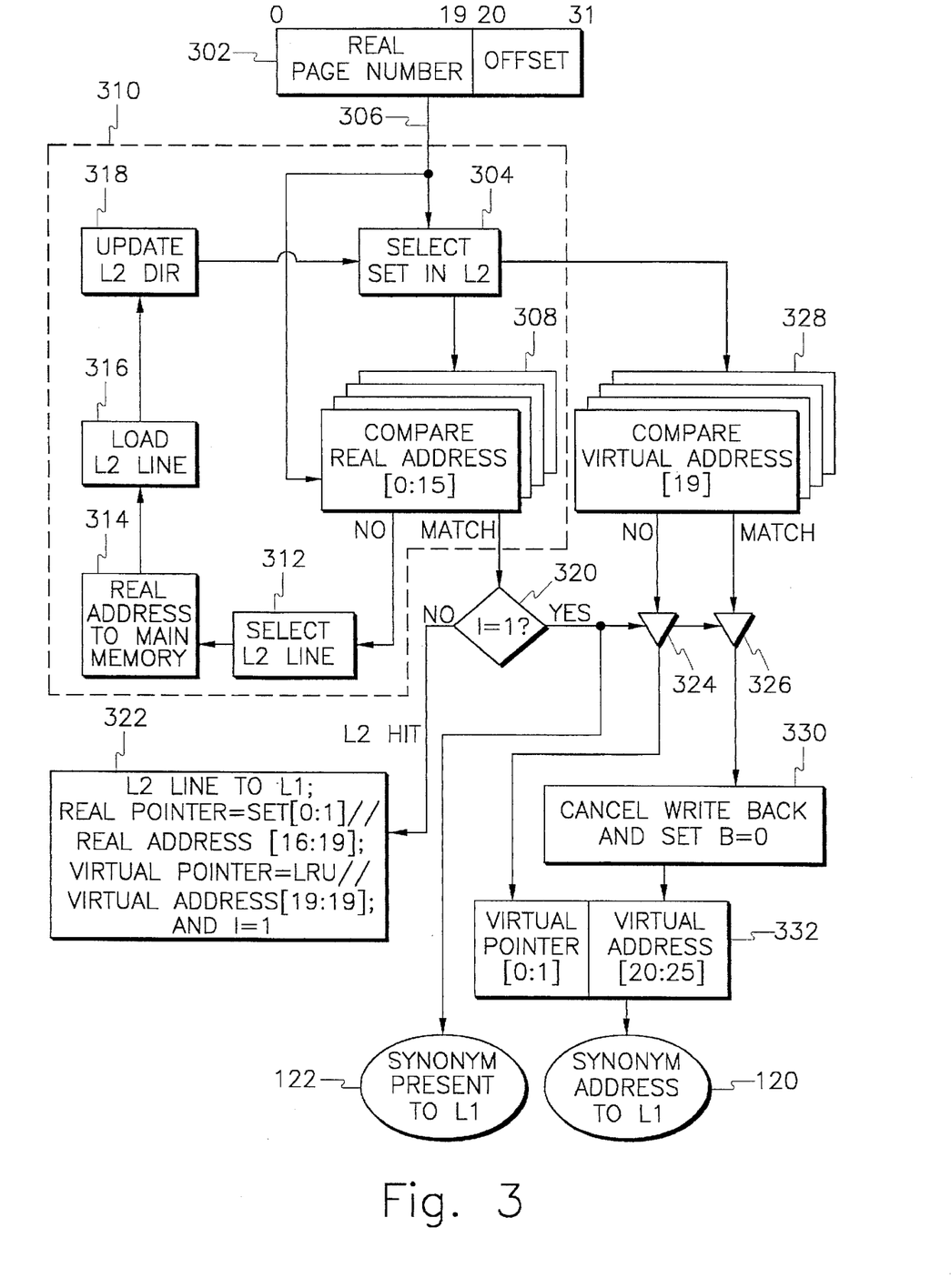
FIG. 3 shows a representative flow chart of a real cache (L2) in a preferred embodiment of the present invention.

Referring now to FIG. 3, each time an L1 miss occurs, the TLB is invoked to generate a real address for indexing the L2 cache. A real address 302 from the TLB is shown at the top of FIG. 3. In the present example, the real address comprises a 20-bit real page number and a 12-bit offset. The offset of the real address is the same as the offset of the virtual address.

In a preferred embodiment of the present invention L2 is a 256 KB cache (which totals $2^{18}$ locations), with a line size of 64 bytes (which is $2^6$), and it is a 4-way set-associative cache (which is $2^2$ lines per set). Therefore, subtracting the line size and set size from the total, the cache system needs 18−6−2=10 bits to index the L2 cache. In this embodiment, indexing of the L2 cache is done using 6 offset bits and the least significant 4 bits (bits [16:19]) of the real page number, which totals 10 bits. The real tag for each entry in L2 is the remaining real page number bits [0:15].

Once a real address is received by the real cache L2, the set is selected, as shown at a step or step 304. Next, the real address tag (RT) bits [0:15] are compared to the real address tag in each line of the selected set. A line 306 indicates that bits [0:15] come directly from the real address. Four comparisons are required because L2 is 4-way set-associative (i.e., 4 lines per set), as shown generally at steps 308. If no match is made as represented by the "no" result, a loop 310 is entered (the steps within the dashed box). In loop 310: an L2 line is selected (see step 312), the real address received from the TLB is sent to main memory (see step 314), the data returned to L2 by the main memory is loaded into the selected line of L2 (see step 316), and the L2 directory is updated (see step 318). Flow returns to step 304 and then the comparisons at steps 308 are performed again. This time, because the data has been retrieved from main memory, the comparisons at steps 310 will result in a "match".

When a line "match" occurs, the inclusion tag I is evaluated, as shown at a step 320. If the I=1 comparison is "no" (i.e., the data is not included in the L1 cache), flow proceeds to a step 322. At step 322, the relationship between caches L2 and L1 is set up and the data is sent to the cache L1. The six bit real pointer (RP) in L1 is formed by concatenating the real cache set bits (SET [0:1]) with real address bits (RA[16:19]); the two bit virtual pointer (VP) in L2 is formed by concatenating the LRU bit with virtual address bit (VA[19:19]); and the I tag is set equal to 1.

If the I=1 comparison is "yes" (i.e., the data is included in the L1 cache), a synonym has been detected and a "syn to L1" signal is sent to L1 to indicate so (see 122). In other words, there are two virtual addresses for a single data entry. This signal is also used for enabling a pair of tri-state buffering steps 324 and 326 as a way to pass on the results generated by virtual pointer comparator steps 328.

In parallel with the line comparison at steps 308, the second bit VP[1] of the virtual pointer in each line of the selected set in cache L2 is compared with bit [19] of the virtual address corresponding to the received real address, as shown at the set of comparator steps 328. (Note that the virtual address is readily available, since it is simultaneously sent to L2 and to the TLB from the CPU. Also, which virtual pointer bit is used for the comparison is simply a design choice; it is the bit not used for the line selection shown in FIG. 2A. Thus, in this example, the "Partial Virtual Pointer" shown in FIG. 2B is bit [0] of the virtual pointer.)

The results from the comparisons at steps 328 corresponds to cases 3 and 4 discussed above. If the virtual pointer comparison fails (i.e., no match is made), this indicates that an L1 line in another set actually holds the needed data. If the virtual pointer comparison results in a match, L1 actually contains the needed line in the same set by coincidence. Therefore, L1 cancels its write back to main memory for the replaced line, if one exists, the buffer tag is reset to 0, as shown at a step 330. In either case, the synonym virtual address, formed by a 2-bit virtual pointer (VP[0:1]) concatenated with 6 bits of the virtual address offset (VA [20:25]) are sent to index the L1 cache, as shown generally at a step 332. In effect, only the virtual pointer bits need to be sent to L1, because the offset does not change.

As discussed above, the forwarding of comparison information from steps 328 is controlled by the tri-state buffer steps 324 and 326, under control of the "syn" signal. If no synonym is detected, it is not necessary to cancel the L1 write back.

In conclusion, the two-level virtual/real cache system of the present invention provides for parallel accesses to TLB and L1 cache and solving synonym problems without requiring a reverse translation table. The approach shows its simplicity with little hardware overhead for solving synonym problems usually associated with virtual address caches.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A two-level virtual/real cache system comprising:
   a virtual cache having virtually addressed memory locations for storing data, wherein each of said virtually addressed memory locations has a virtual tag and a real pointer associated therewith;
   a real cache having real addressed memory locations for storing data, wherein each of said real addressed memory locations has a real tag, a virtual pointer and synonym information associated therewith, the associated synonym information indicating whether data stored in an associated real addressed memory location is also stored in one of said virtually addressed memory locations; and
   a translation-lookaside buffer for translating virtual addresses into real addresses;
   wherein when said virtual cache receives a request for data having a virtual address, said virtual cache compares the virtual address of said request with the associated virtual tag of each of said virtually addressed memory locations which are indexed to determine whether data associated with said request is stored in said virtual cache, and
     (a) if the comparison results in a match, said virtual cache outputs the requested data, or
     (b) if the comparison does not result in a match,
       said virtual cache selects a cache line in said virtual cache to be replaced and sends information about the selected line to said real cache,
       said translation-lookaside buffer translates the virtual address of said request into a real address of said request and sends the real address of said request to said real cache, and
       said real cache compares the real address of said request with the associated real tag of each of said real addressed memory locations which are indexed to determine whether the data associated with said request is stored in said real cache and whether a synonym exists, and
       (a) if the data associated with said request is stored in said real cache and said synonym does not exist, then said real cache outputs the data associated with said request to said virtual cache using said information about the selected line,
       (b) if the data associated with said request is not stored in said real cache, then said real cache selects a cache line in said real cache to be replaced, or
       (c) if the data associated with said request is stored in said real cache and said synonym exists, then said real cache resolves said synonym using the associated virtual pointer and the associated synonym information to locate the requested data within said virtual cache.

2. The two-level virtual/real cache system according to claim 1, wherein the synonym information comprises an inclusion bit for indicating whether the data associated with said request is stored in said virtual cache.

3. The two-level virtual/real cache system according to claim 1, wherein said virtual cache includes a write back buffer for temporary storage of the data associated with the selected line.

4. The two-level virtual/real cache system according to claim 1, wherein said virtual cache and said real cache are each a set associative cache with at least two sets.

5. The two-level virtual/real cache system according to claim 4, wherein said real pointer comprises a real cache set bit for selecting said real cache sets.

6. The two-level virtual/real cache system according to claim 4, wherein said virtual cache and said real cache each use a least recently used (LRU) policy for selecting a cache line to be replaced.

7. The two-level virtual/real cache system according to claim 6, wherein said virtual pointer comprises a LRU bit for indicating which of said virtual cache sets is least recently used.

8. A method for detecting and resolving synonyms in a two-level virtual/real cache system including a virtual cache having virtually addressed memory locations for storing data, each of said virtually addressed memory locations having a virtual tag and a real pointer associated therewith, a real cache having real addressed memory locations for storing data, each of said real addressed memory locations having a real tag, a virtual pointer and synonym information associated therewith, the associated synonym information indicating whether data stored in an associated real addressed memory location is also stored in one of said virtually addressed memory locations, and a translation-lookaside buffer for translating virtual addresses into real addresses, the method comprising the steps of:

receiving a request for data having a virtual address, comparing the virtual address of the request with the associated virtual tag of each of the virtually addressed memory locations which are indexed to determine whether data associated with the request is stored in the virtual cache, and (a) if the comparison results in a match, outputting the requested data from the virtual cache, or (b) if the comparison does not result in a match, selecting a cache line in the virtual cache to be replaced and sending information about the selected line to the real cache, translating the virtual address of the request into a real address of the request using the translation-lookaside and sending the real address of the request to the real cache, and comparing the real address of the request with the associated real tag of each of the real addressed memory locations which are indexed to determine whether the data associated with the request is stored in the real cache and whether a synonym exists, and (a) if the data associated with the request is stored in the real cache and said synonym does not exist, then outputting the data associated with the request from the real cache to the virtual cache using the information about the selected line, (b) if the data associated with the request is not stored in the real cache, then selecting a cache line in the real cache to be replaced, or (c) if the data associated with the request is stored in the real cache and said synonym exists, then resolving the synonym using the associated virtual pointer and the associated synonym information to locate the requested data within said virtual cache.

9. The method according to claim 8, wherein the synonym information comprises an inclusion bit for indicating whether the data associated with the request is stored in the virtual cache.

10. The method according to claim 8, wherein the virtual cache includes a write back buffer for temporary storage of the data associated with the selected line.

11. The method according to claim 8, wherein the virtual cache and the real cache are each a set associative cache with at least two sets.

12. The method according to claim 11, wherein the real pointer comprises a real cache set bit for selecting the real cache sets.

13. The method according to claim 11, wherein the virtual cache and the real cache each use a least recently used (LRU) policy in selecting a cache line to be replaced.

14. The method according to claim 13, wherein the virtual pointer comprises a LRU bit for indicating which of the virtual cache sets is least recently used.

* * * * *